(12) United States Patent  
Liu

(10) Patent No.: US 7,299,016 B2  
(45) Date of Patent: Nov. 20, 2007

(54) COMMUNICATION DEVICE WITH AN ADJUSTABLE BRIGHTNESS

(75) Inventor: Chien-Hung Liu, Taipei (TW)

(73) Assignee: Inventec Corporation, Taipei (TW)

( * ) Notice: Subject to any disclaimer, the term of this patent is extended or adjusted under 35 U.S.C. 154(b) by 0 days.

(21) Appl. No.: 11/329,245

(22) Filed: Jan. 11, 2006

(65) Prior Publication Data

US 2007/0159419 A1    Jul. 12, 2007

(51) Int. Cl.
*H01Q 11/12* (2006.01)
(52) U.S. Cl. ........... 455/127.1; 455/108; 455/186.1; 455/183.2; 455/566
(58) Field of Classification Search .......... 455/95, 455/77, 108, 120, 127.1, 403, 566, 572, 159.1, 455/186.2, 158.4, 183.2, 186.1; 345/419, 345/422, 629; 362/29, 800; 315/169.3, 315/362, 294, 312
See application file for complete search history.

(56) References Cited

U.S. PATENT DOCUMENTS 7,079,174 B2 *  7/2006 Taniguchi et al. .......... 348/51

2004/0116163 A1 *  6/2004 Kim et al. .......... 455/575.1
2006/0033484 A1 *  2/2006 Kung et al. .......... 323/334
2007/0024571 A1 *  2/2007 Maniam et al. .......... 345/102

* cited by examiner

*Primary Examiner*—Haissa Philogene
(74) *Attorney, Agent, or Firm*—Bacon & Thomas, PLLC

(57) ABSTRACT

The present invention discloses a communication device with an adjustable brightness that includes a control circuit coupled to a modulating unit, and the modulating unit includes a tuning button disposed on the communication device that allows user to make adjustments or controls by the tuning button to produce a first set value, and the modulating unit converts the power received by a power supply circuit of the communication device into a corresponding operating voltage according to the first set value and sends the operating voltage to a light emitting unit of the communication device for projecting a light source according to the magnitude of the operating voltage, so as to adjust and change the brightness of the light emitting unit, and achieve the effects of saving power and extending the life of the light emitting units.

9 Claims, 2 Drawing Sheets

COMMUNICATION DEVICE WITH AN ADJUSTABLE BRIGHTNESS

FIELD OF THE INVENTION

The present invention relates to a communication device with an adjustable brightness, and more particularly to a communication device capable of adjusting the brightness of its light source according to the environment.

BACKGROUND OF THE INVENTION

If a traditional mobile phone is powered on and set to a using mode such as dialing a call or inputting a short message, a plurality of light emitting devices such as a light emitting diode (LED) installed in the mobile phone will obtain power. After the light emitting components have obtain power to produce a light, the light is projected to a keyboard and a screen of the mobile phone to illuminate the keyboard and the screen, so that a mobile phone user can clearly see the words, icons, and the like on the keyboard and the screen while the user is dialing a call, receiving a short message, or playing a game.

However, the design of the light emitting components on the mobile phone produces a light source with a constant brightness only, regardless of the environment, so that if the mobile phone is used in an environment with strong sunlight, the light emitting component still produces the light source with a constant brightness. Such arrangement not only wastes power, but also reduces the life of the light emitting components. Furthermore, if the mobile phone is used at nighttime, the light emitting component still produces a light source with the constant brightness, and such bright light will affect other people. Therefore, finding a way of designing a communication device with an adjustable brightness is an important subject that demands immediate attention and feasible solutions.

SUMMARY OF THE INVENTION

In view of the shortcomings of the prior art mobile phones, the inventor of the present invention based on years of experience to conduct extensive researches and experiments, and finally invented a communication device with an adjustable brightness.

Therefore, it is a primary objective of the present invention to provide a communication device with an adjustable brightness that includes a control circuit coupled to a modulating unit, wherein the modulating unit further includes a tuning button exposed from the communication device for allowing users to make adjustments or controls by the tuning button to produce a corresponding first set value, and the modulating unit converts the power received by a power supply circuit of the communication device into a corresponding operating voltage according to the first set value and sends the operating voltage to a light emitting unit of the communication device for projecting a light source according to the magnitude of the operating voltage, so as to adjust and control the tuning button, quickly change the brightness of the light emitting unit, and achieve the effects of saving power, extending the life of the light emitting units, and not disturbing other people.

The above and other objects, features and advantages of the present invention will become apparent from the following detailed description taken with the accompanying drawings.

DETAILED DESCRIPTION OF THE PREFERRED EMBODIMENTS

Figure 1:
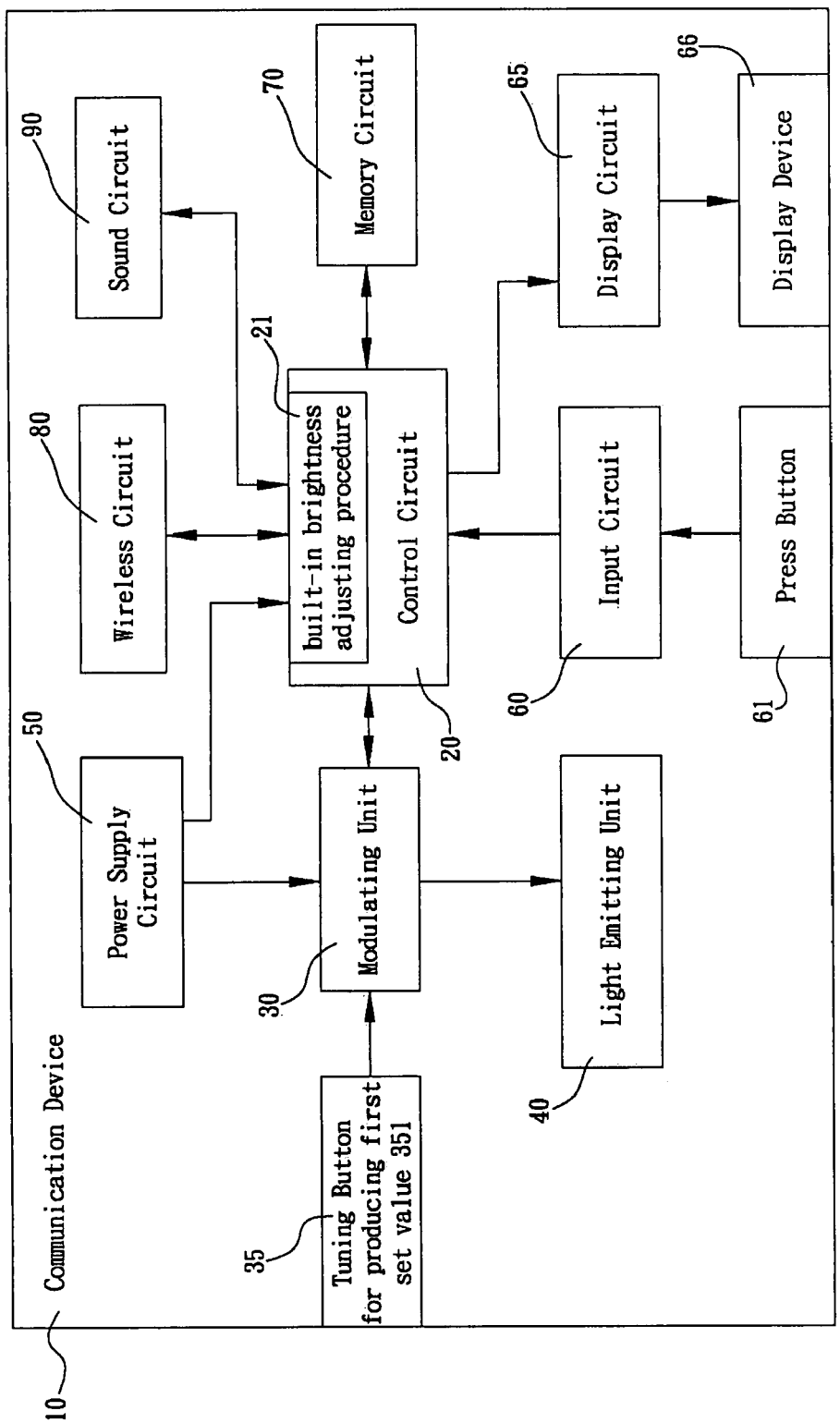
FIG. 1 is a schematic circuit diagram of a communication device of the present invention.

Referring to FIG. 1 for the communication device with an adjustable brightness, the communication device 10 comprises a control circuit 20, a power supply circuit 50, a modulating unit 30, and a light emitting unit 40, wherein the control circuit 20 and the communication device 10 include an electronic component and an electronic circuit electrically coupled with each other, so that the communication device 10 can be operated normally. The control circuit 20 can produce a corresponding light emitting signal according to the using status of the communication device (such as dialing a call), and the power supply circuit 50 is separately and electrically coupled to each electronic component and electronic circuit in the control circuit 20 and the communication device 10, and the power supply circuit 50 can provide a power supply to be used by the communication device 10. The modulating unit 30 and the control circuit 20 are electrically coupled with each other, and the modulating unit 30 can receive the light emitting signal produced by the control circuit 20. The modulate circuit is coupled to the power supply circuit 50 for receiving the power supply produced by the power supply circuit 50, and the modulating unit 30 can produce a corresponding operating voltage according to the light emitting signal.

In FIG. 1, the modulating unit 30 includes a tuning button 35 such as a resistance knob or a section switch, and the tuning button 35 is exposed from the communication device 10 and provided for users to make adjustments and controls, so as to produce a corresponding first set value, and the modulating unit 30 can change the magnitude of the operating voltage according to the first set value, and the light emitting unit 40 is electrically coupled to the modulating unit 30. The light emitting unit 40 can receive an operating voltage produced by the modulating unit 30 and produce a light source with a different brightness according to the operating voltage and project the light outward. Users can quickly change the brightness of the light protected from the light emitting unit 40 to achieve the effects of saving power, extending the life of the light emitting unit 40, and not disturbing other people.

In the present invention as shown in FIG. 1, the communication device 10 further comprises an input circuit 60, a display circuit 65, a memory circuit 70, a wireless circuit 80, and a sound circuit 90, wherein the input circuit 60 and the control circuit 20 are electrically coupled with each other, and the input circuit 60 includes a plurality of press buttons 61, and one of the press buttons 61 can be pressed to produce a corresponding input signal and send the input signal to the control circuit 20. The control circuit 20 analyzes and decodes the input signal into the corresponding text, number, or function, and the display circuit 65 is electrically coupled with the control circuit 120, and the display circuit 65 includes a display device 66, and the display circuit 65 can produce corresponding information such as a text, a number, or a figure on the display device 66 according to the display signal produced by the control circuit 20.

In FIG. 1, the memory circuit 70 is used to store the operating system and application programs required for the normal operation of the communication device 10 and carry out the operations of the control circuit 20. The wireless circuit 80 and the control circuit 20 are electrically coupled with each other, and the wireless circuit 80 is connected to another communication device 10 in a wireless manner, so that the two communication devices 10 can send voices, texts, and graphic data with each other. The sound circuit 90 and the control circuit 20 are electrically coupled with each other, and the sound circuit 90 can receive an analog sound signal from the outside and convert the analog sound signal into a digital voice signal to be transmitted to the control circuit 20. The sound circuit 90 also can receive a digital voice signal from the control circuit 20. After the sound circuit 90 converts the digital voice signal into an analog sound signal, the analog sound signal can be played.

Figure 2:
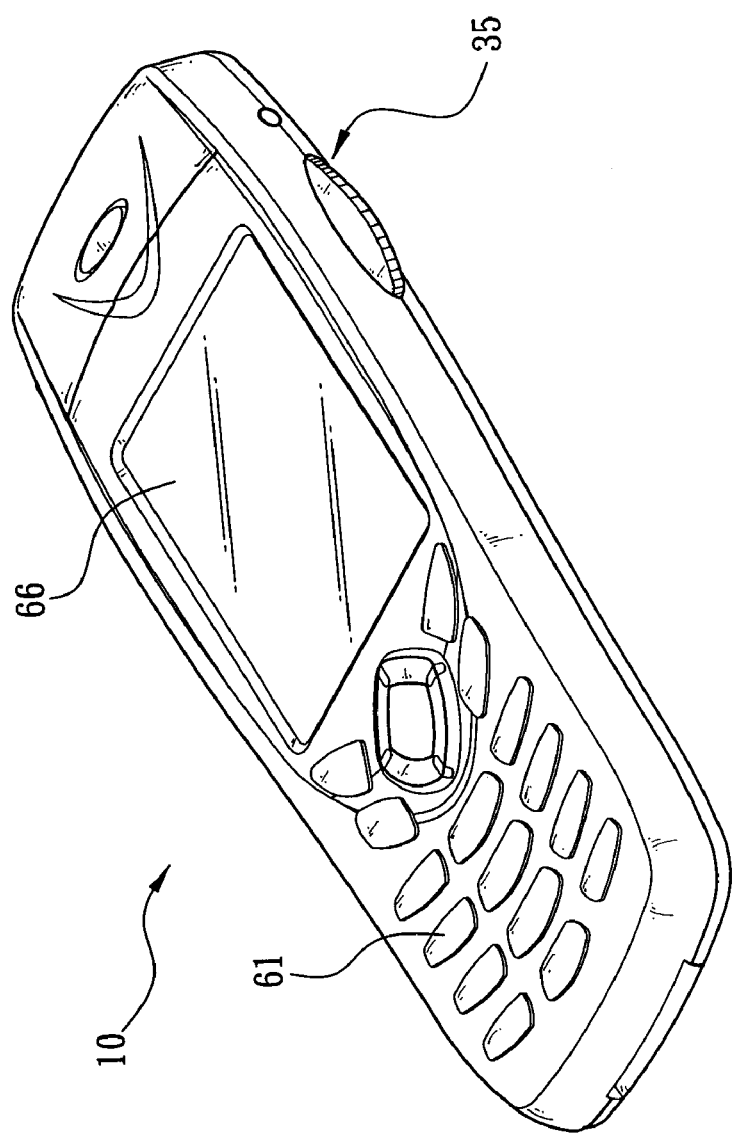
FIG. 2 is a perspective view of a communication device of the present invention.

In the present invention as shown in FIGS. 1 and 2, the light emitting unit 40 projects a light source in the directions of the press buttons 61, the display device 66, and/or the tuning button 35, such that when the light source is projected to the press buttons 61, the display device 66, and/or the tuning button 35, the press buttons 61, the display device 66, and/or the tuning button 35 can be illuminated. If a light source is projected onto the press buttons 61 and the display device 66, users can see the text, number, and graphic information on the illuminated press buttons 61 and display device 66 of the communication device 10. A light source is projected onto the tuning button 35 to facilitate users to make adjustments and controls.

Referring to FIGS. 1 and 2 for the preferred embodiment of the present invention, the light emitting signal produced by the control circuit 20 can record a second set value, so that the modulate circuit receives a light emitting signal from the control circuit 20. After the light emitting signal is analyzed and decoded into the second set value, the modulating unit 30 produces a corresponding operating voltage to be used by the light emitting unit 40 according to the analysis and comparison between the first and second set values. For example, the second set value is a maximum critical voltage which could be a default setting set by the manufacturer of the communication device or set by the user, in order to limit the brightness of the light source projected by the light emitting unit 40. If the modulating unit 30 determines that the first set value is smaller than the second set value, the modulating unit 30 will produce a corresponding operating voltage according to the first set value. If the first set value is larger than the second set value, the modulating unit 30 will produce a corresponding operating voltage according to the second set value to achieve the purpose of limiting the brightness of the light emitting unit 40. In addition, the second set value can automatically change the brightness according to the current time (such as daytime or nighttime) of using the communication device 10, so that the modulating unit 30 can produce a smaller second set value for the daytime to limit the brightness of the light emitting unit 40 or produces a larger second set value for the nighttime to increase the brightness of the light emitting unit 40.

In the preferred embodiment of the present invention as shown in FIGS. 1 and 2, the communication device 10 includes a built-in brightness adjusting procedure 21, and the control circuit 20 can receive the first set value from the modulating unit 30, such that after the control circuit 20 has received the first set value, an adjust signal with a corresponding magnitude will be produced according to the magnitude of the first set value. The brightness adjusting procedure 21 receives the adjust signal and produces a brightness signal of a corresponding magnitude according to the adjust signal and sends the brightness signal to the display circuit 65. The display circuit 65 such as a liquid crystal display device (an LCD) adjusts the backlight brightness of the display device 66 according to the magnitude of the brightness signal, so that when a user uses the communication device 10 in different environments, the backlight brightness can be adjusted quickly to achieve the effect of providing the best display status.

While the invention herein disclosed has been described by means of specific embodiments, numerous modifications and variations could be made thereto by those skilled in the art without departing from the scope and spirit of the invention set forth in the claims.

What is claimed is:

1. A communication device with an adjustable brightness, comprising:

a control circuit, for producing a light emitting signal according to using status of said communication device;

a power supply circuit, electrically coupled to said control circuit for supplying a power required by the normal operation of said control circuit;

a modulating unit for producing a first set value, electrically coupled to said control circuit for receiving said light emitting signal, and being coupled to said power supply circuit for receiving a power supply produced by said power supply circuit, producing a corresponding operating voltage according to said light emitting signal, and changing the magnitude of said operating voltage according to said first set value;

a light emitting unit, electrically coupled to said modulating unit for receiving an operating voltage produced by said modulating unit and producing a light source of a different brightness according to the magnitude of said operating voltage;

an input circuit, electrically coupled to said control circuit and including a plurality of press buttons for producing an input signal and sending said input signal to said control circuit for analyzing and decoding said input signal into a corresponding text, number, or function; and a display circuit, electrically coupled to said control circuit and including a display device for displaying a corresponding text, number, or graphic data on said display device according to a display signal produced by said control circuit.

2. The communication device of claim 1, wherein said modulating unit comprises a tuning button exposed from said communication device for producing said first set value of different magnitudes.

3. The communication device of claim 2, wherein said light emitting signal records a second set value, such that said modulating unit produces a corresponding operating voltage according to a result of the comparison between said first and second set values.

4. The communication device of claim 3, wherein said second set value is a maximum critical voltage.

5. The communication device of claim 2, wherein said communication device includes a built-in brightness adjusting procedure for receiving an adjust signal produced by said control circuit according to said first set value and producing a corresponding brightness signal according to said adjust signal, and sending said brightness signal to said display circuit, such that said display circuit adjusts the backlight brightness of said display device according to the magnitude of said brightness signal.

6. The communication device of claim 4, wherein said light emitting unit faces said input circuit and/or said display circuit for producing a light source to be projected onto said press buttons and said display device.

7. The communication device of claim 5, wherein said light emitting unit faces said input circuit and/or said display circuit for producing a light source to be projected onto said press buttons and said display device.

8. A communication device with an adjustable brightness, comprising:

a modulating unit, for producing a first set value;

a control circuit, electrically coupled to said modulating unit and including a built-in brightness adjusting procedure for receiving said first set value to produce a corresponding adjust signal and producing a corresponding brightness signal according to said adjust signal;

a display circuit, including a display device and electrically coupled to said control circuit for receiving said brightness signal and adjusting the backlight brightness of said display device according to said brightness signal;

a power supply circuit, electrically coupled to said control circuit for supplying a power required by the normal operation of said control circuit; and an input circuit, including a plurality of press buttons and electrically coupled to said control circuit for producing an input signal and sending said input signal to said control circuit for analyzing and decoding said input signal into a corresponding text, number, or function.

9. The communication device of claim 8, wherein said modulating unit includes a tuning button exposed from said communication device for producing said first set value of different magnitudes.

* * * * *